(12) United States Patent  (10) Patent No.: US 11,300,430 B2
Zhang et al.  (45) Date of Patent: Apr. 12, 2022

(54) METHOD FOR IRRIGATING FARMLAND

(71) Applicant: China Institute of Water Resources and Hydropower Research, Beijing (CN)

(72) Inventors: Shaohui Zhang, Beijing (CN); Di Xu, Beijing (CN); Wei Dai, Beijing (CN); Meijian Bai, Beijing (CN); Qunchang Liu, Beijing (CN); Fuxiang Li, Beijing (CN)

(73) Assignee: China Institute of Water Resources and Hydropower Research, Beijing (CN)

( * ) Notice: Subject to any disclaimer, the term of this patent is extended or adjusted under 35 U.S.C. 154(b) by 516 days.

(21) Appl. No.: 16/304,447

(22) PCT Filed: Jun. 30, 2016

(86) PCT No.: PCT/CN2016/087881
§ 371 (c)(1),
(2) Date: Nov. 26, 2018

(87) PCT Pub. No.: WO2017/201812
PCT Pub. Date: Nov. 30, 2017

(65) Prior Publication Data
US 2019/0145803 A1 May 16, 2019

(30) Foreign Application Priority Data
May 26, 2016 (CN) .......................... 201610363320.2

(51) Int. Cl.
G01F 1/00 (2006.01)
G01F 23/00 (2006.01)
G01F 1/002 (2022.01)

(52) U.S. Cl.
CPC .............. *G01F 1/002* (2013.01); *G01F 23/00* (2013.01)

(58) Field of Classification Search
CPC ....................................... G01F 1/002
See application file for complete search history.

(56) References Cited

U.S. PATENT DOCUMENTS

2004/0156681 A1* 8/2004 Aughton .............. G05B 13/048
405/52
2015/0369641 A1* 12/2015 Rick .................. G01N 27/4168
702/45

FOREIGN PATENT DOCUMENTS

CN 1898672 A 1/2007
CN 102288229 A 12/2011
(Continued)

OTHER PUBLICATIONS

First Chinese Office Action dated Jun. 1, 2018.
International Search Report dated Feb. 23, 2017.

*Primary Examiner* — Matthew G Marini
(74) *Attorney, Agent, or Firm* — Dilworth & Barrese, LLP.; Michael J. Musella, Esq.

(57) ABSTRACT

A method for acquiring a canal flow rate, comprising: measuring an actual measure value of an upstream water depth and an actual measure value of a downstream water depth of a target canal; presetting the upstream canal flow rate and surface water infiltration rate of the target canal, and respectively acquiring preset values of each; substituting the actual measured value of the upstream water depth, the preset value of the upstream canal flow rate, and the preset value of the surface water infiltration rate into Saint-Venant equations, so as to solve the equations and obtain a downstream water depth simulation value of the target canal; when the relative error between the downstream water depth simulation value and the actual measured value of the (Continued)

downstream water depth is less than or equal to the preset threshold value, acquiring a viable upstream canal flow rate and a viable surface water infiltration rate; otherwise, optimizing the preset value of the upstream canal flow rate and the preset value of the surface water infiltration rate, and repeating the described process until the relative error between the two is less than or equal to the preset threshold value, so as to acquire the two viable results and acquire the canal flow rate at any measurement point of the target canal.

8 Claims, 3 Drawing Sheets

(56) References Cited

FOREIGN PATENT DOCUMENTS

| | | |
|---|---|---|
| CN | 102818758 A | 12/2012 |
| CN | 103323068 | 9/2013 |
| CN | 203324144 U | 12/2013 |
| CN | 105353620 A | 2/2016 |
| DE | 4435019 A1 | 3/1995 |
| DE | 102009021976 A1 | 11/2010 |

* cited by examiner

METHOD FOR IRRIGATING FARMLAND

This application claims the priority of the Chinese patent application No. 201610363320.2, filed with the National Intellectual Property Administration, PRC on May 26, 2016, and entitled as "Method for Acquiring Canal Flow Rate", which is incorporated herein by reference in its entirety.

TECHNICAL FIELD

The present invention relates to the field of farmland irrigation, and in particular, to a method for acquiring canal flow rate.

BACKGROUND

At present, surface irrigation implemented through water transportation and distribution of an irrigation canal system is one of the most widely used farmland irrigation modes. The irrigation canal system is generally composed of multi-stage irrigation canals. In order to achieve efficient irrigation and save water, the measurement of canal flows is very important as irrigation needs of different stages of irrigation canals are different, that is, water flows in the canals are different.

In the prior art, generally, flowmeters or hydraulic structures are used to measure the canal flows. Although measurement through the flowmeters is quick and convenient, an expensive ultrasonic current meter is required. In a measurement process through the hydraulic structures, it is required to build the hydraulic structures such as a check gate, a sluice gate and the like at specific measurement points of the irrigation canals.

In the process of implementing the present invention, the inventor finds that the prior art at least has the following technical problems.

The ultrasonic current meter used in the prior art is expensive, and lots of labor and materials are wasted while building the hydraulic structures.

SUMMARY

The technical solutions of the present disclosure are as follows.

In an aspect, there is provided a method for acquiring a canal flow rate, comprising:

measuring an upstream water depth and a downstream water depth of a target canal to obtain a measured value of the upstream water depth and a measured value of the downstream water depth of the target canal;

presetting an upstream canal flow rate of the target canal and a surface water infiltration rate of the target canal to obtain a preset value of the upstream canal flow rate and a preset value of the surface water infiltration rate;

substituting the measured value of the upstream water depth, the preset value of the upstream canal flow rate and the preset value of the surface water infiltration rate into Saint-Venant equations to solve so as to obtain a simulation value of the downstream water depth of the target canal;

comparing the simulation value of the downstream water depth with the measured value of the downstream water depth, and confirming that the preset values of both the upstream canal flow rate and the surface water infiltration rate are viable when a relative error between the simulation value and the measured value of the downstream water depth is less than or equal to a preset threshold value, when the relative error between the simulation value and the measured value is greater than the preset threshold value, optimizing the preset values of both the upstream canal flow rate and the surface water infiltration rate, substituting the measured value of the upstream water depth, the optimized values of both the upstream canal flow rate and the surface water infiltration rate again into Saint-Venant equations to solve so as to obtain a simulation value of the downstream water depth of the target canal till the relative error between the simulation value and the measured value of the downstream water depth is less than or equal to the preset threshold value to obtain a viable preset value of the upstream canal flow rate and a viable preset value of the surface water infiltration rate; and acquiring a canal flow rate at any measurement point of the target canal based on the viable preset value of the upstream canal flow rate and surface water infiltration rate.

Optionally, the measured values of the upstream water depth and the downstream water depth of the target canal are obtained by vertically placing a water gauge at the upstream and the downstream of the target canal, respectively.

Optionally, substituting the measured value of the upstream water depth, the preset value of the upstream canal flow rate and the preset value of the surface water infiltration rate into Saint-Venant equations to solve so as to obtain a simulation value of the downstream water death of the target canal comprises: re-expressing the Saint-Venant equations to obtain discrete expressions of the Saint-Venant equations.

The measured value of the upstream water depth, the preset value of the upstream canal flow rate and the preset value of the surface water infiltration rate are substituted into the discrete expressions of the Saint-Venant equations to solve so as to obtain the simulation value of the downstream water depth of the target canal.

The Saint-Venant equations are as follows:

$$\frac{\partial A}{\partial t} + \frac{\partial Q}{\partial x} = -I;$$

and $$\frac{\partial Q}{\partial t} + \frac{\partial}{\partial x}\left(\frac{Q^2}{A}\right) = -gA\frac{\partial \zeta}{\partial x} - g\frac{n^2 Q|Q|}{R^{4/3} A}.$$

The discrete expressions of the Saint-Venant equations are as follows:

$$\frac{A_i^{n_t+1} - A_i^{n_t}}{\Delta t} + \frac{Q_{i+1/2}^{n_t+1} - Q_{i-1/2}^{n_t+1}}{\Delta x} = -I_i^{n_t};$$

and $$\frac{Q_i^{n_t+1} - Q_i^{n_t}}{\Delta t} + \frac{1}{\Delta x}\left[\frac{\left(Q_{i+1/2}^{n_t+1}\right)^2}{A_{i+1/2}^{n_t+1}} - \frac{\left(Q_{i-1/2}^{n_t+1}\right)^2}{A_{i+1/2}^{n_t+1}}\right] =$$
$$-gA_i^{n_t+1}\frac{\zeta_{i+1/2}^{n_t+1} - \zeta_{i-1/2}^{n_t+1}}{\partial x} - g\frac{n^2 Q_i^{n_t+1}|Q_i^{n_t+1}|}{\left(R_i^{n_t+1}\right)^{4/3} A_i^{n_t+1}}.$$

Here, x is the distance between any measurement point of the target canal and the upstream of the target canal in m; t is a time coordinate of the target canal whose observation time is regarded as zero in s; A is an area of the flow cross section at any measurement point of the target canal in m$^2$, and A=tan $\theta$*h$^2$+wh; w is the width of the bottom surface of the target canal in m; h is a water depth at any measurement point of the target canal in m; $\theta$ is an included angle between each of two side slopes of the target canal and the vertical direction; Q is the canal flow rate at any measurement point of the target canal in m³/s; g is the gravitational acceleration in m/s²; $\zeta$ is the water surface elevation in m, and $\zeta=Z_b+h$; $Z_b$ is a relative elevation of the canal bottom at any measurement point of the target canal in m; n is a Manning roughness coefficient in s/m^(1/3), and its empirical value is 0.001-0.1; I is a water surface infiltration rate in m/s; R is a hydraulic radius and R=A/P, wherein P is wetted perimeter in m; $n_t$ is a time discrete node obtained at time t; i is a space discrete node obtained based on x; i+½ is the midpoint between space discrete nodes i and i+1; and i−½ is the midpoint between space discrete nodes i−1 and i.

Optionally the relative error between the simulation value and the measured value of the downstream water depth is obtained through the following calculation formula:

$$ARE = \frac{|h_c - h_d|}{h_d} \times 100\%,$$

wherein ARE is the relative error; $h_c$ is the simulation value of the downstream water depth in m; and hd is the measured value of the downstream water depth in m.

Optionally, the preset values of both the upstream canal flow rate and the surface water infiltration rate are optimized through a genetic algorithm.

Optionally, the preset threshold value is less than or equal to 1.5%.

Optionally, the preset threshold is less than 1%.

Optionally, the canal flow rate at any measurement point of the target canal is obtained according to the viable upstream canal flow rate and surface water infiltration rate through the following formula: $Q_{u0}=I_k \times L+Q_x$, wherein $Q_{u0}$ is the viable upstream canal flow rate in m³/s, namely the finalized preset value of the upstream canal flow; $Q_x$ is the canal flow rate at any measurement point of the target canal in m³/s; $I_k$ is the viable surface water infiltration rate, namely the finalized preset value of the surface water infiltration rate; and L is the distance between any measurement point and the upstream of the target canal in m.

In another aspect, there is provided a device for acquiring a canal flow rate, comprising: a processor; a memory for storing instructions executable by the processor; wherein the processor is configured to:

obtain a measured value of an upstream water depth and a measured value of a downstream water depth of the target canal; set an upstream canal flow rate of the target canal and a surface water infiltration rate of the target canal to obtain a preset value of the upstream canal flow rate and a preset value of the surface water infiltration rate;

substitute the measured value of the upstream water depth, the preset value of the upstream canal flow rate and the preset value of the surface water infiltration rate into Saint-Venant equations to solve so as to obtain a simulation value of the downstream water depth of the target canal;

compare the simulation value of the downstream water depth with the measured value of the downstream water depth, and confirm that the preset values of both the upstream canal flow rate and the surface water infiltration rate are viable when a relative error between the simulation value and the measured value of the downstream water depth is less than or equal to a preset threshold value, when the relative error between the simulation value and the measured value is greater than the preset threshold value, optimize the preset values of both the upstream canal flow rate and the surface water infiltration rate, substitute the measured value of the upstream water depth, the optimized values of both the upstream canal flow rate and the surface water infiltration rate again into Saint-Venant equations to solve so as to obtain a simulation value of the downstream water depth of the target canal till the relative error between the simulation value and the measured value of the downstream water depth is less than or equal to the preset threshold value to obtain a viable preset value of the upstream canal flow rate and a viable preset value of the surface water infiltration rate; and obtain a canal flow rate at any measurement point of the target canal based on the viable preset value of the upstream canal flow rate and surface water infiltration rate.

Optionally, the processor is further configured to: re-express the Saint-Venant equations to obtain discrete expressions of the Saint-Venant equations; and substitute the measured value of the upstream water depth, the preset values of both the upstream canal flow rate and the surface water infiltration rate into the discrete expressions of the Saint-Venant equations to solve so as to obtain a simulation value of the downstream water depth of the target canal, wherein the Saint-Venant equations are as follows:

$$\frac{\partial A}{\partial t} + \frac{\partial Q}{\partial x} = -I, \text{ and}$$

$$\frac{\partial Q}{\partial t} + \frac{\partial}{\partial x}\left(\frac{Q^2}{A}\right) = -gA\frac{\partial \zeta}{\partial x} - g\frac{n^2 Q|Q|}{R^{4/3}A};$$

and
the discrete expressions of the Saint-Venant equations are as follows:

$$\frac{A_i^{n_t+1} - A_i^{n_t}}{\Delta t} + \frac{Q_{i+1/2}^{n_t+1} - Q_{i-1/2}^{n_t+1}}{\Delta x} = -I_i^{n_t}, \text{ and}$$

$$\frac{Q_i^{n_t+1} - Q_i^{n_t}}{\Delta t} + \frac{1}{\Delta x}\left[\frac{(Q_{i+1/2}^{n_t+1})^2}{A_{i+1/2}^{n_t+1}} - \frac{(Q_{i-1/2}^{n_t+1})^2}{A_{i-1/2}^{n_t+1}}\right] =$$

$$-gA_i^{n_t+1}\frac{\zeta_{i+1/2}^{n_t+1} - \zeta_{i-1/2}^{n_t+1}}{\partial x} - g\frac{n^2 Q_i^{n_t+1}|Q_i^{n_t+1}|}{(R_i^{n_t+1})^{4/3} A_i^{n_t+1}},$$

wherein x is the distance between any measurement point of the target canal and the upstream of the target canal in m; t is a time coordinate of the target canal whose observation time is regarded as zero in s; A is an area of the flow cross section at any measurement point of the target canal in m2, and A=tanθ*h2+wh; w is the width of the bottom surface of the target canal in m; h is a water depth at any measurement point of the target canal in m; θ is an included angle between each of two side slopes of the target canal and the vertical direction; Q is the canal flow rate at any measurement point of the target canal in m3/s; g is the gravitational acceleration in m/s2; $\zeta$ is the water surface elevation in m, and $\zeta=Zb+h$; Zb is a relative elevation of the canal bottom at any measurement point of the target canal in m; n is a Manning roughness coefficient in s/m⅓, and its empirical value is 0.001-0.1; I is a water surface infiltration rate in m/s; R is a hydraulic radius and R=A/P, wherein P is wetted perimeter in m; nt is a time discrete node obtained at time t; i is a space discrete node obtained based on x; i+½ is the midpoint between space discrete nodes i and i+1; and i−½ is the midpoint between space discrete nodes i−1 and i.

Optionally, the relative error between the simulation value and the measured value of the downstream water depth is obtained through the following calculation formula:

$$ARE = \frac{|h_c - h_d|}{h_d} 100\%,$$

wherein ARE is the relative error; hc is the simulation value of the downstream water depth in m; and hd is the measured value of the downstream water depth in m.

Optionally, the preset values of both the upstream canal flow rate and the surface water infiltration rate are optimized by a genetic algorithm.

Optionally, the preset threshold value is less than or equal to 1.5%.

Optionally, the preset threshold is less than 1%.

Optionally, the canal flow rate at any measurement point of the target canal is obtained according to the viable upstream canal flow rate and surface water infiltration rate through the following formula:

$$Q_{u0} = I_k \times L + Q_x,$$

wherein $Q_{u0}$ is the viable upstream canal flow rate in m3/s, namely the viable preset value of the upstream canal flow rate; Qx is the canal flow rate at any measurement point of the target canal in m3/s; Ik is the viable surface water infiltration rate, namely the finalized preset value of the surface water infiltration rate; and L is the distance between any measurement point and the upstream of the target canal in m.

In yet another aspect, there is provided a computer-readable storage medium having stored therein instructions loaded and executed by a processor for performing operations of:

obtaining a measured value of an upstream water depth and a measured value of a downstream water depth of the target canal;

setting an upstream canal flow rate of the target canal and a surface water infiltration rate of the target canal to obtain a preset value of the upstream canal flow rate and a preset value of the surface water infiltration rate;

substituting the measured value of the upstream water depth, the preset value of the upstream canal flow rate and the preset value of the surface water infiltration rate into Saint-Venant equations to solve so as to obtain a simulation value of the downstream water depth of the target canal;

comparing the simulation value of the downstream water depth with the measured value of the downstream water depth, and confirm that the preset values of both the upstream canal flow rate and the surface water infiltration rate are viable when a relative error between the simulation value and the measured value of the downstream water depth is less than or equal to a preset threshold value, when the relative error between the simulation value and the measured value is greater than the preset threshold value, optimize the preset values of both the upstream canal flow rate and the surface water infiltration rate, substitute the measured value of the upstream water depth, the optimized values of both the upstream canal flow rate and the surface water infiltration rate again into Saint-Venant equations to solve so as to obtain a simulation value of the downstream water depth of the target canal till the relative error between the simulation value and the measured value of the downstream water depth is less than or equal to the preset threshold value to obtain a viable preset value of the upstream canal flow rate and a viable preset value of the surface water infiltration rate; and obtaining a canal flow rate at any measurement point of the target canal based on the viable preset value of the upstream canal flow rate and surface water infiltration rate.

Optionally, the instructions are loaded and executed by the processor for performing operations of:

re-expressing the Saint-Venant equations to obtain discrete expressions of the Saint-Venant equations; and substituting the measured value of the upstream water depth, the preset values of both the upstream canal flow rate and the surface water infiltration rate into the discrete expressions of the Saint-Venant equations to solve so as to obtain a simulation value of the downstream water depth of the target canal, wherein the Saint-Venant equations are as follows:

$$\frac{\partial A}{\partial t} + \frac{\partial Q}{\partial x} = -I, \text{ and}$$

$$\frac{\partial Q}{\partial t} + \frac{\partial}{\partial x}\left(\frac{Q^2}{A}\right) = -gA\frac{\partial \zeta}{\partial x} - g\frac{n^2 Q|Q|}{R^{4/3}A};$$

and the discrete expressions of the Saint-Venant equations are as follows:

$$\frac{A_i^{n_t+1} - A_i^{n_t}}{\Delta t} + \frac{Q_{i+1/2}^{n_t+1} - Q_{i-1/2}^{n_t+1}}{\Delta x} = -I_i^{n_t}, \text{ and}$$

$$\frac{Q_i^{n_t+1} - Q_i^{n_t}}{\Delta t} + \frac{1}{\Delta x}\left[\frac{(Q_{i+1/2}^{n_t+1})^2}{A_{i+1/2}^{n_t+1}} - \frac{(Q_{i-1/2}^{n_t+1})^2}{A_{i-1/2}^{n_t+1}}\right] =$$

$$-gA_i^{n_t+1}\frac{\zeta_{i+1/2}^{n_t+1} - \zeta_{i-1/2}^{n_t+1}}{\partial x} - g\frac{n^2 Q_i^{n_t+1}|Q_i^{n_t+1}|}{(R_i^{n_t+1})^{4/3} A_i^{n_t+1}},$$

wherein x is the distance between any measurement point of the target canal and the upstream of the target canal in m; t is a time coordinate of the target canal whose observation time is regarded as zero in s; A is an area of the flow cross section at any measurement point of the target canal in m2, and A=tanθ*h2+wh; w is the width of the bottom surface of the target canal in m; h is a water depth at any measurement point of the target canal in m; θ is an included angle between each of two side slopes of the target canal and the vertical direction; Q is the canal flow rate at any measurement point of the target canal in m3/s; g is the gravitational acceleration in m/s2; ζ is the water surface elevation in m, and ζ=Zb+h; Zb is a relative elevation of the canal bottom at any measurement point of the target canal in m; n is a Manning roughness coefficient in s/m⅓, and its empirical value is 0.001-0.1; I is a water surface infiltration rate in m/s; R is a hydraulic radius and R=A/P, wherein P is wetted perimeter in m; nt is a time discrete node obtained at time t; i is a space discrete node obtained based on x; i+½ is the midpoint between space discrete nodes i and i+1; and i−½ is the midpoint between space discrete nodes i−1 and i.

Optionally, the preset values of both the upstream canal flow rate and the surface water infiltration rate are optimized by a genetic; algorithm.

Optionally, the canal flow rate at any measurement point of the target canal is obtained according to the viable upstream canal flow rate and surface water infiltration rate through the following formula:

$$Q_{u0} = I_k \times L + Q_x,$$

wherein $Q_{u0}$ is the viable upstream canal flow rate in m³/s, namely the viable preset value of the upstream canal flow rate; $Q_x$ is the canal flow rate at any measurement point of the target canal in m³/s; $I_k$ is the viable surface water infiltration rate, namely the finalized preset value of the surface water infiltration rate; and L is the distance between any measurement point and the upstream of the target canal in m.

In the canal flow rate acquisition method provided by the embodiments of the present invention, based on the actually measured upstream water depth and downstream water depth of the target canal, the measured value of the upstream water depth, the preset value of the upstream canal flow rate and the preset value of the surface water infiltration rate are substituted into the Saint-Venant equations to solve so as to obtain the simulation value of the downstream water depth of the target canal; the simulation value of the downstream water depth is compared with the measured value of the downstream water depth; it means that the preset values of both the upstream canal flow rate and the surface water infiltration rate are viable when the relative error between the simulation value and the measured value of the downstream water depth is less than or equal to the preset threshold value; or otherwise, the preset values of both the upstream canal flow rate and the surface water infiltration rate are optimized till they are viable. Through the obtained viable upstream canal flow rate and surface water infiltration rate, the canal flow rate at any measurement point of the target canal can be calculated. The method does not need to use an expensive flowmeter or to build hydraulic structures, and can obtain the flow rate of the target canal only by measuring the upstream and downstream water depths thereof, thus the method saves time and labor, and is low in cost, efficient and accurate.

BRIEF DESCRIPTION OF THE DRAWINGS

In order to illustrate the technical solutions of the embodiments provided by the present invention more clearly, a brief description may be given hereinafter to the drawings that may be used in the description of the embodiments. Apparently, the drawings in the description below are merely for illustrating some embodiments of the present invention, and other drawings may be obtained by those skilled in the art according to these drawings without creative labor.

Figure 1:
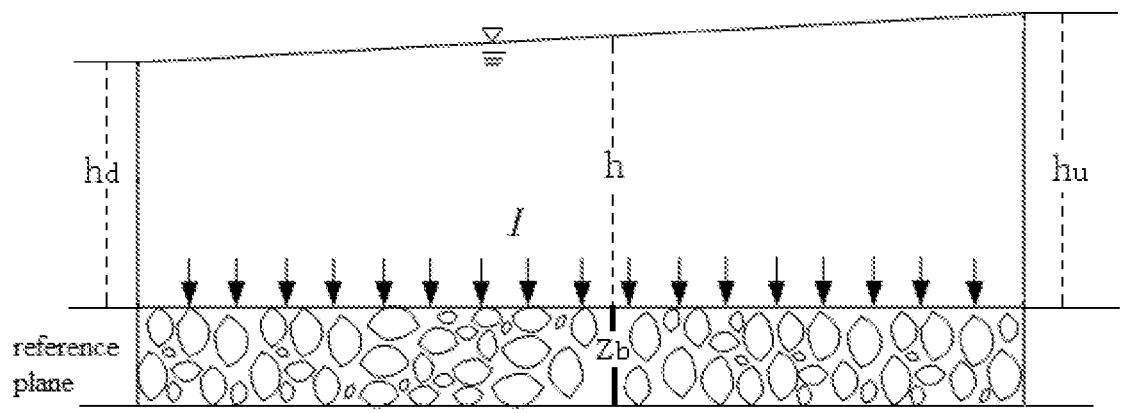
FIG. 1 is a cross section view of a target canal in a water flow direction provided by an embodiment of the present invention.

REFERENCE NUMERALS $h_u$: a measured value of an upstream water depth; $h_d$: a measured value of a downstream water depth; I: a surface water infiltration rate; h: a water depth at any measurement point of a canal; w: a bottom width of a canal; and θ: an included angle between each of two side slopes and the vertical direction.

DETAILED DESCRIPTION

To make the objectives, technical solutions and advantages of the present invention more clear, the followings will describe the embodiments of the present invention in detail with reference to the drawings.

The present invention provides a method for acquiring a canal flow rate, including: step 101, measuring an upstream water depth and a downstream water depth of a target canal to obtain a measured value of the upstream water depth and a measured value of the downstream water depth of the target canal; step 102, presetting an upstream canal flow rate of the target canal and a surface water infiltration rate of the target canal to obtain a preset value of the upstream canal flow rate and a preset value of the surface water infiltration rate; step 103, substituting the measured value of the upstream water depth, the preset value of the upstream canal flow rate and the preset value of the surface water infiltration rate into Saint-Venant equations to solve so as to obtain a simulation value of the downstream water depth of the target canal; step 104, comparing the simulation value of the downstream water depth with the measured value of the downstream water depth, and confirming that the preset values of both the upstream canal flow rate and the surface water infiltration rate are viable when a relative error between the simulation value and the measured value of the downstream water depth is less than or equal to a preset threshold value, when the relative error between the simulation value and the measured value is greater than the preset threshold value, optimizing the preset values of both the upstream canal flow rate and the surface water infiltration rate, repeating step 103 with the optimized upstream canal flow rate and surface water infiltration rate till the relative error between the simulation value and the measured value of the downstream water depth is less than or equal to the preset threshold value to obtain a viable preset value of the upstream canal flow rate and a viable preset value of the surface water infiltration rate; and step 105, acquiring a canal flow rate at any measurement point of the target canal based on the viable preset value of the upstream canal flow rate and surface water infiltration rate.

In the canal flow rate acquisition method provided by the embodiments of the present invention, based on the actually measured upstream water depth and downstream water depth of the target canal, the measured value of the upstream water depth, the preset value of the upstream canal flow rate and the preset value of the surface water infiltration rate are substituted into the Saint-Venant equations to solve so as to obtain the simulation value of the downstream water depth of the target canal; the simulation value of the downstream water depth is compared with the measured value of the downstream water depth; it means that the preset values of both the upstream canal flow rate and the surface water infiltration rate are viable when the relative error between the simulation value and the measured value of the downstream water depth is less than or equal to the preset threshold value; or otherwise, the preset values of both the upstream canal flow rate and the surface water infiltration rate are optimized till they are viable. Through the obtained viable upstream canal flow rate and surface water infiltration rate, the canal flow rate at any measurement point of the target canal can be calculated. The method does not need to use an expensive flowmeter or to build hydraulic structures, and can obtain the flow of the target canal only by measuring the upstream and downstream water depths thereof, thus the method saves time and labor, and is low in cost, efficient and accurate.

Particularly, terms "upstream" and "downstream" in the embodiments of the present invention refer to the head position and the tail position of the target canal, respectively. The measured value of the upstream water depth of the target canal refers to the height difference between the upstream water surface and the canal bottom of the target canal, and is represented by $h_u$ shown in FIG. 1, for example; the measured value of the downstream water depth of the target canal refers to the height difference between the downstream water surface and the canal bottom of the target canal, and is represented by $h_d$ in FIG. 1, for example; I in FIG. 1 is the surface water infiltration rate of the target canal; and h is the water depth at any measurement point of the target canal. In the embodiments of the present invention, the measured values of the upstream and downstream water depths of the target canal can be measured through a liquid level gauge, a sounding lead, a sounding rod, a water gauge or another tool. For the purpose of simple and rapid operation, preferably, the water gauge is vertically placed at the upstream position and the downstream position of the target canal respectively to obtain the measured values of the upstream and downstream water depths of the target canal by reading the scales of the water gauge at the water surfaces.

After acquiring the measured values of the upstream and downstream water depths of the target canal, the upstream canal flow rate of the target canal and the surface water infiltration rate of the target canal are preset through step 102; that is, the canal flow rate at an upstream position of the target canal and an average surface water infiltration rate of the target canal are estimated. In this process, the above two values are preset mainly based on the experience of a technician to improve the practicability of the preset values of the upstream canal flow rate and the surface water infiltration rate.

Further, in the embodiments of the present invention, based on data obtained in the foregoing steps, the simulation value of the downstream water depth of the target canal is obtained through step 103. Particularly, step 103 comprises: re-expressing the Saint-Venant equations to obtain discrete expressions of the Saint-Venant equations. The measured value of the upstream water depth, the preset value of the upstream canal flow rate and the preset value of the surface water infiltration rate are substituted into the discrete expressions of the Saint-Venant equations to solve to obtain the simulation value of the downstream water depth of the target canal.

The Saint-Venant equations are as follows:

$$\frac{\partial A}{\partial t} + \frac{\partial Q}{\partial x} = -I; \text{ and}$$

$$\frac{\partial Q}{\partial t} + \frac{\partial}{\partial x}\left(\frac{Q^2}{A}\right) = -gA\frac{\partial \zeta}{\partial x} - g\frac{n^2 Q|Q|}{R^{4/3}A}.$$

Here, x is the distance between any measurement point of the target canal and the upstream of the target canal in m; t is a time coordinate of the target canal whose observation time is regarded as zero in s; A is an area of the flow cross section at any measurement point of the target canal in m$^2$, and A=tan θ*h$^2$+wh; w is the width of the bottom surface of the target canal in m; h is a water depth at any measurement point of the target canal in m; θ is an included angle between each of two side slopes of the target canal and the vertical direction; Q is the canal flow rate at any measurement point of the target canal in m$^3$/s; g is the gravitational acceleration in m/s$^2$; ζ is the water surface elevation in m, and ζ=$Z_b$+h; $Z_b$ is a relative elevation of the canal bottom at any measurement point of the target canal in m; n is a Manning roughness coefficient in s/m$^{1/3}$, and its empirical value is 0.001-0.1; I is a water surface infiltration rate in m/s; and R is a hydraulic radius and R=A/P, wherein P is wetted perimeter in m.

Figure 2:
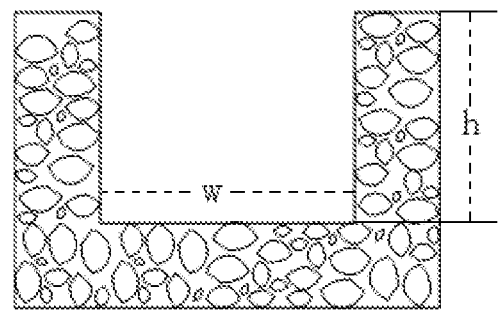
FIG. 2 is a cross section view of a canal with a rectangular cross section provided by an embodiment of the present invention.
Figure 3:
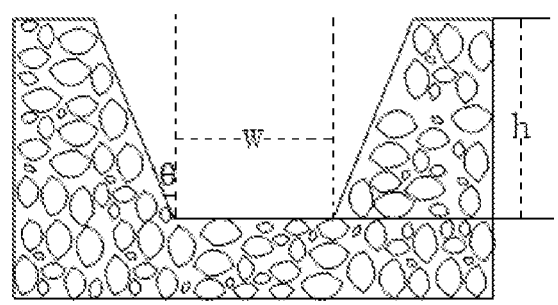
FIG. 3 is a cross section view of a canal with a trapezoidal cross section provided by an embodiment of the present invention.

The area A of the flow cross section can be calculated according to A=tan θ*h$^2$+wh, wherein as shown in FIGS. 2 and 3, θ is an included angle between each of two side slopes of a canal and the vertical direction, and w is the width of the canal bottom. For example, when the cross section of the canal is rectangular, as shown in FIG. 2, the included angle θ between each of two side slopes of the canal and the vertical direction is 0 degree, and the area of the flow cross section A=wh. When the cross section of the canal is trapezoidal, as shown in FIG. 3, the included angle θ between each of two side slopes of the canal and the vertical direction is greater than 0 degree, and the area of the flow cross section A=tan θ*h$^2$+wh.

Particularly, the above is the water surface elevation; as shown in FIG. 1, generally, a horizontal plane lower than the bottom of the entire canal is selected as a reference plane; and ζ=$Z_b$+h; wherein $Z_b$ is a relative height between the canal bottom at any measurement point of the target canal and the reference plane, and h is a water depth at the measurement point of the target canal.

It can be seen from the above that the Saint-Venant equations are established on continuous time-space coordinate axes, and thus are difficult to be solved. In order to solve the equations easily and quickly, in the embodiments of the present invention, the Saint-Venant equations are re-expressed to obtain discrete expressions of the Saint-Venant equations by discretizing time and space regions where the Saint-Venant equations are located through a numerical method. After this, the Saint-Venant equations can be solved easily.

The obtained discrete expressions of the Saint-Venant equations are as follows:

$$\frac{A_i^{n_t+1} - A_i^{n_t}}{\Delta t} + \frac{Q_{i+1/2}^{n_t+1} - Q_{i-1/2}^{n_t+1}}{\Delta x} = -I_i^{n_t}; \text{ and}$$

$$\frac{Q_i^{n_t+1} - Q_i^{n_t}}{\Delta t} + \frac{1}{\Delta x}\left[\frac{\left(Q_{i+1/2}^{n_t+1}\right)^2}{A_{i+1/2}^{n_t+1}} - \frac{\left(Q_{i-1/2}^{n_t+1}\right)^2}{A_{i-1/2}^{n_t+1}}\right] =$$

$$-gA_i^{n_t+1}\frac{\zeta_{i+1/2}^{n_t+1} - \zeta_{i-1/2}^{n_t+1}}{\partial x} - g\frac{n^2 Q_i^{n_t+1}|Q_i^{n_t+1}|}{\left(R_i^{n_t+1}\right)^{4/3} A_i^{n_t+1}}.$$

Here, $n_t$ is a time discrete node obtained at the time t; i is a space discrete node obtained based on x; i+½ is the midpoint between space discrete nodes i and i+1; and i−½ is the midpoint between space discrete nodes i−1 and i.

As shown above, in particular, time may be discretized into finite numbers of discrete time nodes, such as 0, 1, 2, 3, . . . , $n_t$, or $n_t$+1 discrete time nodes, particularly, 10-30 time discrete nodes. Space may be discretized into finite numbers of discrete space nodes, such as 0, 1, 2, 3, . . . , $i_t$, or $i_t$+1 space discrete nodes, particularly, 10-30 discrete space nodes. The time difference between two adjacent time discrete nodes is a time step Δt, and the distance between two adjacent space discrete nodes is a space step Δx. Under the condition that the time steps Δt are consistent and the space steps Δx are consistent, an area of the flow cross section and a canal flow rate of a target canal corresponding to any time discrete node $n_t$ and any space discrete node i may be calculated through a finite volume method. The selection of an initial condition, a boundary condition and the like involved in the numerical solving process by use of the finite volume method is carried out based on conventional technical means in the art.

For example, coordinates (i, $n_t$) of a space node and a time node at the upstream of the target canal may be set as (0, 0); the preset value of an upstream canal flow rate of the target canal is preset as $Q_0$; the preset value of a surface water infiltration rate of the target canal is preset as $I_0$; the gravitational acceleration g is set as 9.8 m/s$^2$; a water surface elevation at the upstream of the target canal is obtained; the empirical value of a Manning roughness coefficient is determined; a hydraulic radius at the upstream of the target canal and the relative elevation at the canal bottom are obtained; and the above data is substituted into the discrete expressions of the Saint-Venant equations to calculate the area $A_0$ of the flow cross section at the upstream of the target canal and the surface water infiltration rate $I_0$ of the target canal. Then, the preset value $Q_0$ of the upstream canal flow rate of the target canal, the area $A_0$ of the flow cross section at the upstream of the target canal and the surface water infiltration rate $I_0$ of the target canal are substituted into the discrete expressions of the Saint-Venant equations to obtain a simulation valve $Q_1$ of a canal flow, an area $A_1$ of the flow cross section and a surface water infiltration rate $I_1$ at an adjacent space node (1, 1); similarly, the simulation valve $Q_1$ of the canal flow, the area $A_1$ of the flow cross section and the surface water infiltration rate $I_1$ at the node (1, 1) are substituted into the discrete expressions of the Saint-Venant equations to obtain a simulation valve $Q_2$ of a canal flow, an area $A_2$ of the flow cross section and a surface water infiltration rate $I_2$ at an adjacent space node (2, 2); and the like, a simulation valve $Q_c$ of a canal flow, an area $A_c$ of the flow cross section and a surface water infiltration rate $I_c$ at the downstream of the target canal can be obtained. Further, a simulation value of the downstream water depth is obtained according to the area $A_c$ of the flow cross section and the canal bottom width w of the downstream.

After acquiring the simulation value of the downstream water depth of the target canal, in order to confirm whether the preset values of both the upstream canal flow rate and the surface water infiltration rate are close to their actual values, in the embodiment of the present invention, step 104 is performed to obtain a relative error between the simulation value of the downstream water depth and a measured value of the downstream water depth. Particularly, the relative error is calculated as follows:

$$ARE = \frac{|h_c - h_d|}{h_d} 100\%,$$

wherein ARE is the relative error; $h_c$ is the simulation value of the downstream water depth in m; and $h_d$ is the measured value of the downstream water depth in m.

Whether the preset value of the upstream canal flow rate and the preset value of the surface water infiltration rate are viable may be reflected through the calculated relative error between the simulation value and the measured value of the downstream water depth. Moreover, this calculation process lays the foundation for ensuring that the method provided by the embodiments of the present invention can obtain the canal flow rate with high accuracy.

After acquiring the relative error between the simulation value and the measured value of the downstream water depth, the relative error is compared with the preset threshold value, wherein the threshold value is determined based on desired flow accuracy. In general, the preset threshold value is less than or equal to 1.5%; and preferably, it is less than 1%, such as 0.2%, 0.4%, 0.6%, 0.8% and the like.

When the relative error between the simulation value of the downstream water depth and the measured value of the downstream water depth is less than or equal to the preset threshold value, it can be determined that the preset values of both the upstream canal flow rate and the surface water infiltration rate estimated in step 102 are close to their actual values. Otherwise, if the simulation value of the downstream water depth and the measured value of the downstream water depth is greater than the preset threshold value, it indicates that differences between the preset values of both the upstream canal flow rate and the surface water infiltration rate estimated in step 102 and their actual values are obvious. At this time, it is necessary to adjust and optimize the preset values of both the upstream canal flow rate and the surface water infiltration rate estimated first to obtain a second preset value of the upstream canal flow rate and a second preset value of the surface water infiltration rate through re-estimation, and then the re-estimated preset values of the upstream canal flow rate and the surface water infiltration rate, and the measured value of the upstream water depth are substituted into the discrete expressions of the Saint-Venant equations to solve so as to obtain a simulation value of the downstream water depth of the target canal. The above process is continued till a relative error between the simulation value of the downstream water depth and the measured value of the downstream water depth is less than or equal to the preset threshold value.

Particularly, in step 104, the preset values of both the upstream canal flow rate and the surface water infiltration rate are optimized through the genetic algorithm. It can be understood that the genetic algorithm is a common data calculation model and can optimize the preset values of both the upstream canal flow rate and the surface water infiltration rate to effectively obtain the high-accuracy and viable upstream canal flow rate and surface water infiltration rate.

Particularly, the optimization process through the genetic algorithm is as follows: when the relative error between the obtained simulation value of the downstream water depth and the measured value of the downstream water depth is greater than the preset threshold value, the preset values of both the upstream canal flow rate and the surface water infiltration rate are input into a preinstalled genetic algorithm optimization software program. The genetic algorithm optimization software program first codes the preset values of both the upstream canal flow rate and the surface water infiltration rate and randomly generates a plurality of coded string individuals for the preset value of the upstream canal flow rate and a plurality of coded string individuals for the preset value of the surface water infiltration rate. Then, the genetic algorithm optimization software program processes the coded string individuals for the preset values of both the upstream canal flow rate and the surface water infiltration rate to obtain corresponding phenotypes (that is, binary codes); the phenotypes of the coded string individuals for the preset value of the upstream canal flow rate and the simulation value of the surface water infiltration rate are sequentially substituted into the Saint-Venant equations, and the process is continued till the ARE between a simulation value of the downstream water depth and a measured value of the downstream water depth is less than the preset threshold value; and at this time, the obtained viable upstream canal flow, surface water infiltration rate and simulation value of the downstream water depth are converted into decimal numbers, and a result is output.

Particularly, in step 105, a canal flow rate at any measurement point of the target canal is obtained according to the viable upstream canal flow rate and surface water infiltration rate through the following formula:

$Q_{u0}=I_k \times L+Q_x$, wherein $Q_{u0}$ is the viable upstream canal flow rate in m³/s, namely the finalized preset value of the upstream canal flow; $Q_x$ is the canal flow rate at any measurement point of the target canal in m³/s; $I_k$ is the viable surface water infiltration rate, namely the finalized preset value of the surface water infiltration rate; and L is the distance between any measurement point and the upstream of the target canal in m.

Figure 4:
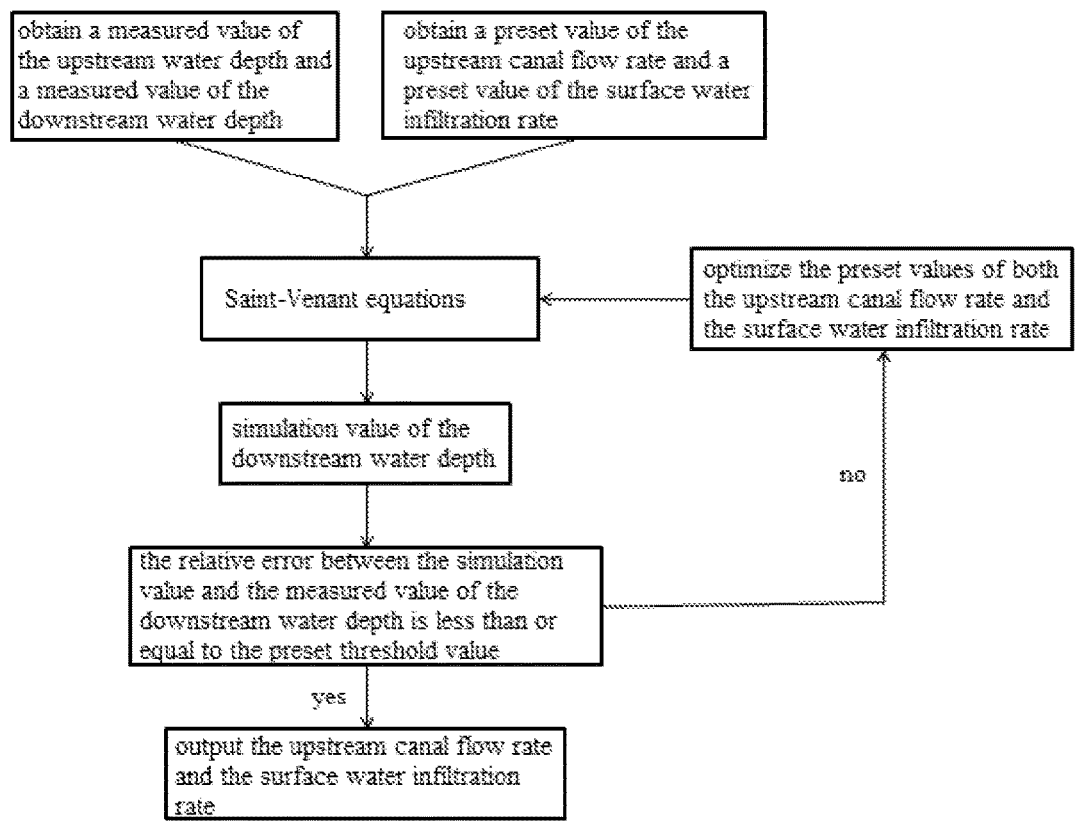
FIG. 4 is a flow chart of a canal flow rate acquisition method provided by an embodiment of the present invention.

Based on the above, it can be seen that the operation procedure of the method provided by the embodiments of the present invention may refer to the flow chart shown in FIG. 4. It can be seen that the method provided by the embodiments of the present invention can obtain the canal flow rate at any measurement point of the target canal by measuring the upstream and downstream water depths thereof only, thus the method saves time and labor, and is low in cost, efficient and accurate.

The present invention will be further described below through specific embodiments.

Embodiment 1

In this embodiment, a 1000-meter canal with a rectangular cross section in Yehe Irrigation District, Hebei province in China is taken as an example to obtain a flow rate of the canal through the method provided by the embodiment of the present invention. Here, basic parameters of the rectangular cross section canal are as follows: the bottom width of the canal is 3.97 m, the roughness coefficient n is 0.022 s·m−⅓, the gravitational acceleration g is 9.8 m/s2, the relative elevation $Z_b$ of the upstream canal bottom is 0.5 m, and the preset value of the hydraulic radius R at the upstream of the canal is 0.86 m. Particularly, the process of acquiring the canal flow rate through the method provided by the embodiment of the present invention comprises the following steps.

In step 101, the upstream water depth and the downstream water depth of the canal with the rectangular cross section are measured through a water gauge to obtain the measured value $h_m$ of the upstream water depth of 1.51 m and the measured value $h_d$ of the downstream water depth of 1.33 m.

In step 102, the upstream canal flow rate of the canal with the rectangular cross section and the surface water infiltration rate of the canal with the rectangular cross section are preset to obtain a preset value $Q_0$ of the upstream canal flow rate of 5.98 m3/s and a preset value $I_0$ of the surface water infiltration rate of 0.0001 m3/s.

In step 103, the measured value $h_u$ of the upstream water depth, the preset value $Q_0$ of the upstream canal flow, the preset value $I_0$ of the surface water infiltration rate, and other provided parameters of the canal with the rectangular cross section are substituted into the discrete expressions of the Saint-Venant equations to solve so as to obtain a simulation value $h_c$ of the downstream water depth of the canal with the rectangular cross section to be 1.334 m. Here, the discrete expressions of the Saint-Venant equations are as follows:

$$\frac{A_i^{n_t+1}-A_i^{n_t}}{\Delta t}+\frac{Q_{i+1/2}^{n_t+1}-Q_{i-1/2}^{n_t+1}}{\Delta x}=-I_i^{n_t}, \text{ and}$$

$$\frac{Q_i^{n_t+1}-Q_i^{n_t}}{\Delta t}+\frac{1}{\Delta x}\left[\frac{(Q_{i+1/2}^{n_t+1})^2}{A_{i+1/2}^{n_t+1}}-\frac{(Q_{i-1/2}^{n_t+1})^2}{A_{i-1/2}^{n_t+1}}\right]=$$

$$-gA_i^{n_t+1}\frac{\zeta_{i+1/2}^{n_t+1}-\zeta_{i-1/2}^{n_t+1}}{\partial x}-g\frac{n^2 Q_i^{n_t+1}|Q_i^{n_t+1}|}{(R_i^{n_t+1})^{4/3}A_i^{n_t+1}},$$

wherein x is the distance between any measurement point of the target canal (namely, the canal with the rectangular cross section) and the upstream of the target canal in m; t is a time coordinate of the target canal whose observation time is regarded as zero in s; A is an area of the flow cross section at any measurement point of the target canal in m², and A=tan θ*h²+wh; w is the width of the bottom surface of the target canal in m; h is a water depth at any measurement point of the target canal in m; θ is an included angle between each of two side slopes of the target canal and the vertical direction; Q is the canal flow rate at any measurement point of the target canal in m³/s; g is the gravitational acceleration in m/s²; ζ is the water surface elevation in m, and ζ=$Z_b$+h; $Z_b$ is a relative elevation of the canal bottom at any measurement point of the target canal in m; n is a Manning roughness coefficient in s/m^(1/3), and its empirical value is 0.001-0.1; I is a water surface infiltration rate in m/s; R is a hydraulic radius and R=A/P, wherein P is wetted perimeter in m; $n_t$ is a time discrete node obtained at time t; i is a space discrete node obtained based on x; i+½ is the midpoint between space discrete nodes i and i+1; and i−½ is the midpoint between space discrete nodes i−1 and i.

In step 104, the simulation value $h_c$ of the downstream water depth is compared with the measured value $h_d$ of the downstream water depth, and a relative error between $h_c$ and $h_d$ is calculated to be 0.3%, so that it is determined that the preset value $Q_0$ of the upstream canal flow rate and the preset value $I_0$ of the surface water infiltration rate are viable as the preset threshold value is 1% which is greater than the relative error.

In step 105, a canal flow rate at any measurement point of the canal with the rectangular cross section is obtained according to the viable upstream canal flow rate and surface water infiltration rate. Here, the canal flow rate is calculated through the following formula:

$Q_{u0}=I_k \times L+Q_x$, wherein $Q_{u0}$ is the viable upstream canal flow rate in m³/s, namely the finalized preset value of the upstream canal flow; $Q_x$ is the canal flow rate at any measurement point of the target canal in m³/s; $I_k$ is the viable surface water infiltration rate, namely the finalized preset value of the surface water infiltration rate; and L is the distance between any measurement point and the upstream of the target canal in m.

Embodiment 2

In the present embodiment, a 1000-meter canal with a trapezoidal cross section in 222 corps of Xinjiang Production and Construction Corps in China is taken as an example to obtain a flow rate of the canal through the method provided by the embodiment of the present invention. Here, basic parameters of the canal with the rectangular cross section are as follows: the bottom width of the canal is 2.45 m, an included angle between each of two side slopes of the canal and the vertical direction is 30 degrees, the roughness coefficient n is 0.22 s·m−⅓, the gravitational acceleration g is 9.8 m/s2, the relative elevation $Z_b$ of the upstream canal bottom is 0.6 m, and the preset value of the hydraulic radius R at the upstream of the canal is 1.27 m.

Particularly, the process of acquiring the upstream canal flow rate of the canal through the method provided by the embodiment of the present invention is the same as that in the method shown in Embodiment 1. However, this method differs from the method shown in Embodiment 1 in that the measured value $h_u$ of the upstream water depth of the canal with the trapezoidal cross section is 2.78 m; the measured value $h_d$ of the downstream water depth is 2.30 m; the preset value $Q_0$ of the upstream canal flow rate is 7.81 m3/s; and the preset value $I_0$ of the surface water infiltration rate is 0.0001 m3/s. The measured value $h_u$ of the upstream water depth, the preset value $Q_0$ of the upstream canal flow, the preset value $I_0$ of the surface water infiltration rate and other provided data of the canal with the trapezoidal cross section are substituted into the discrete expressions of the Saint-Venant equations to solve so as to obtain a simulation value $h_c$ of the downstream water depth of the canal with the trapezoidal cross section to be 2.346 m. Then, a relative error between the simulation value $h_c$ of the downstream water depth and the measured value $h_d$ of the downstream water depth is calculated to be 2% which is greater than 1%. At this time, the preset value $Q_0$ of the upstream canal flow rate and the preset value $I_0$ of the surface water infiltration rate are optimized; then the optimized upstream canal flow rate and surface water infiltration rate are used to repeat the above step of acquiring the simulation value of the downstream water depth till the relative error between the simulation value $h_c$ of the downstream water depth and the measured value $h_d$ of the downstream water depth is less than the preset threshold value that is 1%; and the obtained upstream canal flow rate and surface water infiltration rate at this time after optimization are used as the viable upstream canal flow rate $Q_{u0}$ and the viable surface water infiltration rate Ik. Finally, a canal flow rate at any measurement point of the canal with the trapezoidal cross section is obtained according to the finalized upstream canal flow rate $Q_{u0}$ and surface water infiltration rate Ik.

Embodiment 3

This embodiment evaluates the simulation accuracy of the viable preset values of the upstream canal flow rate finalized in Embodiment 1 and Embodiment 2, and the specific evaluation process is as follows.

In step 201, the finalized viable preset values of the canal with the rectangular cross section and the canal with the trapezoidal cross section are respectively obtained every 2 hours within 24 hours through the methods provided by Embodiment 1 and Embodiment 2, and are used as simulation values of the upstream canal flows of the canal with the rectangular cross section and the canal with the trapezoidal cross section, respectively.

In step 202, corresponding upstream canal flows of the canal with the rectangular cross section and the canal with the trapezoidal cross section are obtained respectively through an ultrasonic flowmeter, and are used as measured values of the upstream canal flows.

Figure 5:
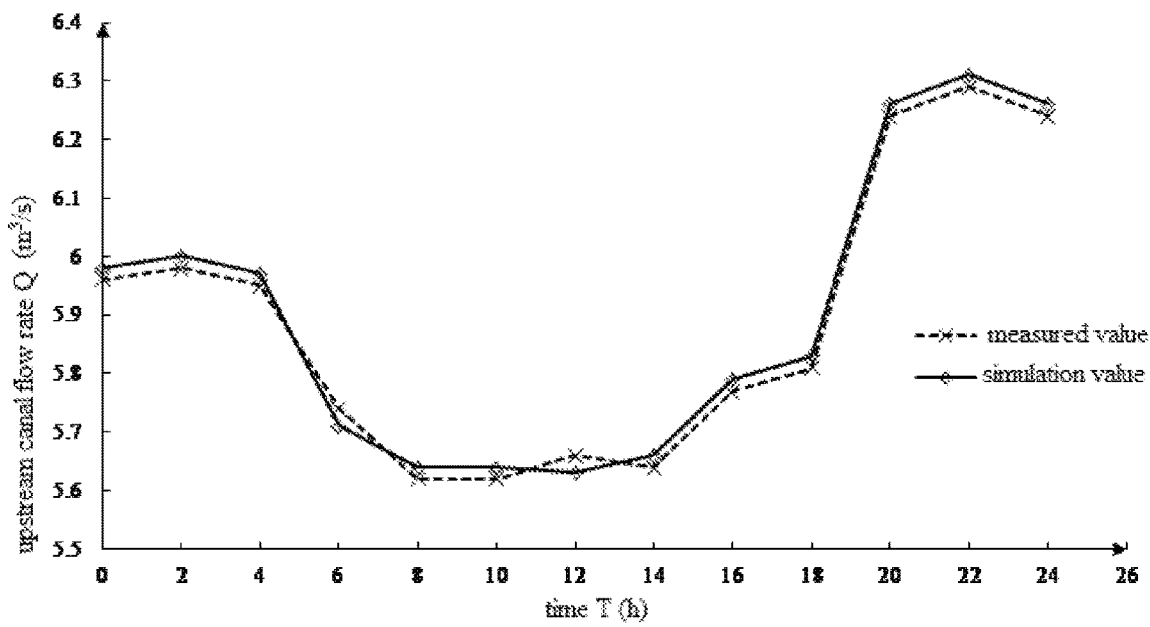
FIG. 5 is a graph showing changes over time of simulation values and measured values of the upstream canal flow rate of a canal with a rectangular cross section provided by an embodiment of the present invention.

In step 203, the time spent in performing the above acquisition process is taken as the x axis, and the upstream canal flows (including the simulation values and the measured values thereof) obtained at different acquisition times are taken as the y axis to obtain a change graph of the simulation values and the measured values of the upstream canal flows in the time performing the above acquisition process. FIG. 5 is a graph showing changes of the simulation values and the measured values of the upstream canal flows of the canal with the rectangular cross section.

Figure 6:
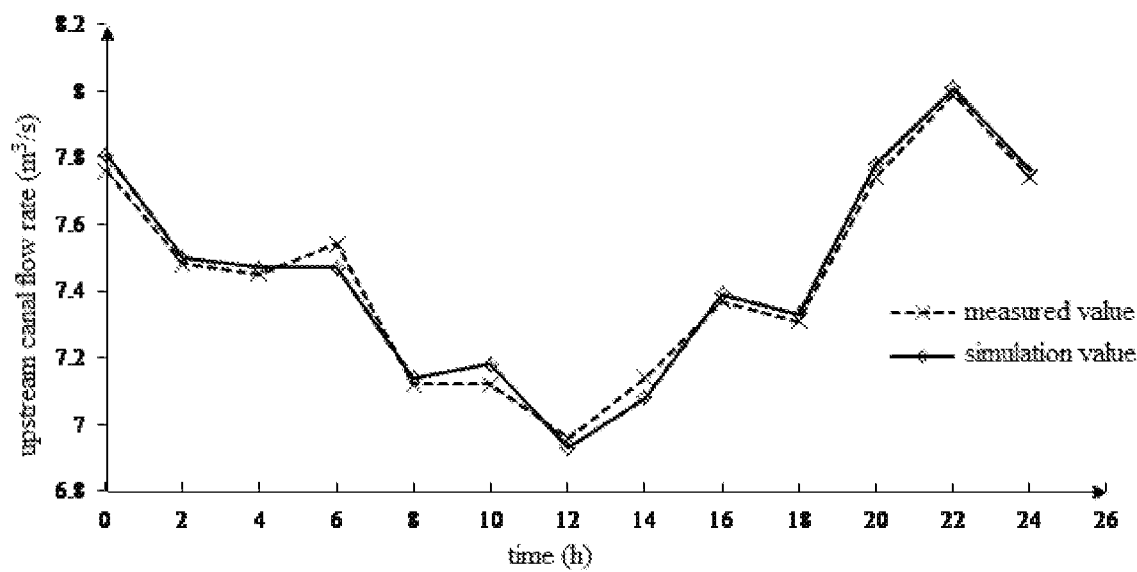
FIG. 6 is a graph showing changes over time of simulation values and measured values of the upstream canal flow rate of a canal with a trapezoidal cross section provided by an embodiment of the present invention.

Similarly, particularly, a change graph of the simulation values and the measured values of the upstream canal flows of the canal with the trapezoidal cross section in the time performing the above acquisition process is shown in FIG. 6.

It can be seen from FIG. 5 that the simulation values and the measured values of the upstream canal flows of the canal with the rectangular cross section are very close. It can be seen from FIG. 6 that the simulation values and the measured values of the upstream canal flows of the canal with the trapezoidal cross section are very close. Therefore, the canal flow rate acquisition method provided by the embodiment of the present invention is higher in simulation accuracy.

Further, in this embodiment, step 204 is also performed to calculate relative errors between the simulation values and the measured values of the upstream canal flows.

Here, the relative error between the obtained simulation value and measured value of the upstream canal flow rate in each acquisition process is calculated through the following formula:

$$E_j = \frac{|Q_j - Q_{oj}|}{Q_{oj}} \times 100\%.$$

Further, the multiple relative errors obtained in the multiple acquisition processes are averaged by the following formula to obtain the average error:

$$\overline{E} = \frac{E_1 + E_2 + \ldots + E_N}{N} \times 100\%,$$

wherein $E_j$ is the relative error between the simulation value and the measured value of the upstream canal flow rate obtained each time; $\overline{E}$ is the average value of the multiple relative errors obtained multiple times, namely, the average error; Qj is the finalized preset value of the upstream canal flow rate obtained at the j-th time, namely the simulation value, wherein j may be 1, 2, and N in m3/s; Qoj is the measured value of the upstream canal flow rate obtained at the j-th time in m3/s, namely the measured value; and N is the number of times that the simulation values or the measured values of the upstream canal flows are obtained, wherein N may be 1, 2, 3, . . . , and 13.

Here, the error data between the obtained simulation values and measured values of the upstream canal flows of the canal with the rectangular cross section are shown in Table 1.

TABLE 1

| Time (h) | Measured value (m3/s) | Simulation value (m3/s) | Relative error (%) | Average error (%) |
|---|---|---|---|---|
| 0 | 5.96 | 5.98 | 0.33 | 0.40 |
| 2 | 5.98 | 6.00 | 0.33 | |
| 4 | 5.95 | 5.97 | 0.34 | |

TABLE 1-continued

| Time (h) | Measured value (m3/s) | Simulation value (m3/s) | Relative error (%) | Average error (%) |
|---|---|---|---|---|
| 6 | 5.74 | 5.71 | 0.53 | |
| 8 | 5.62 | 5.64 | 0.35 | |
| 10 | 5.62 | 5.64 | 0.35 | |
| 12 | 5.66 | 5.63 | 0.53 | |
| 14 | 5.64 | 5.66 | 0.35 | |
| 16 | 5.77 | 5.79 | 0.35 | |
| 18 | 5.81 | 5.83 | 0.34 | |
| 20 | 6.24 | 6.26 | 0.32 | |
| 22 | 6.29 | 6.31 | 0.32 | |
| 24 | 6.24 | 6.26 | 0.32 | |

It can be seen from Table 1 that either the relative error between each simulation value and the corresponding measured value of the upstream canal flow rate of the canal with the rectangular cross section or the average error is less than 1%. Therefore, the canal flow rate acquisition method provided by the embodiment of the present invention is high in simulation accuracy.

Here, the error data between the obtained simulation values and measured values of the upstream canal flows of the canal with the trapezoidal cross section are shown in Table 2.

TABLE 2

| Time (h) | Measured value (m3/s) | Simulation value (m3/s) | Relative error (%) | Average error (%) |
|---|---|---|---|---|
| 0 | 7.76 | 7.81 | 0.64 | 0.51 |
| 2 | 7.48 | 7.5 | 0.27 | |
| 4 | 7.45 | 7.47 | 0.27 | |
| 6 | 7.54 | 7.47 | 0.94 | |
| 8 | 7.12 | 7.14 | 0.28 | |
| 10 | 7.12 | 7.18 | 0.84 | |
| 12 | 6.96 | 6.93 | 0.43 | |
| 14 | 7.14 | 7.08 | 0.85 | |
| 16 | 7.37 | 7.39 | 0.27 | |
| 18 | 7.31 | 7.33 | 0.27 | |
| 20 | 7.74 | 7.78 | 0.51 | |
| 22 | 7.99 | 8.01 | 0.25 | |
| 24 | 7.74 | 7.76 | 0.26 | |

It can be seen from Table 2 that either the relative error between each simulation value and the corresponding measured value of the upstream canal flow rate of the canal with the trapezoidal cross section or the average error is less than 1%. Therefore, the canal flow rate acquisition method provided by the embodiment of the present invention is high in simulation accuracy.

The serial number of the above embodiments are merely for the description of the present invention, and does not represent the relative priority of the embodiments.

The foregoing descriptions are only preferred embodiments of the present invention, and do not intend to limit the protective scope of the present invention. Any variation, equivalent, substitution and/or modification that fall within the spirit and principle of the present invention should be embraced by the protective scope of the present invention.

What is claimed is:

1. A method for irrigating farmland, comprising:

measuring an upstream water depth and a downstream water depth of a target canal through a tool to obtaining a measured value of the upstream water depth and a measured value of the downstream water depth of the target canal;

setting an upstream canal flow rate of the target canal and a surface water infiltration rate of the target canal to obtain a preset value of the upstream canal flow rate and a preset value of the surface water infiltration rate;

substituting the measured value of the upstream water depth, the preset value of the upstream canal flow rate and the preset value of the surface water infiltration rate into Saint-Venant equations to solve so as to obtain a simulation value of the downstream water depth of the target canal;

comparing the simulation value of the downstream water depth with the measured value of the downstream water depth, and confirm that the preset values of both the upstream canal flow rate and the surface water infiltration rate are viable when a relative error between the simulation value and the measured value of the downstream water depth is less than or equal to a preset threshold value, when the relative error between the simulation value and the measured value is greater than the preset threshold value, optimize the preset values of both the upstream canal flow rate and the surface water infiltration rate, substitute the measured value of the upstream water depth, the optimized values of both the upstream canal flow rate and the surface water infiltration rate again into Saint-Venant equations to solve so as to obtain a simulation value of the downstream water depth of the target canal till the relative error between the simulation value and the measured value of the downstream water depth is less than or equal to the preset threshold value to obtain a viable preset value of the upstream canal flow rate and a viable preset value of the surface water infiltration rate;

obtaining a canal flow rate at any measurement point of the target canal based on the viable preset value of the upstream canal flow rate and surface water infiltration rate; and irrigating the farmland at the measurement point based on the canal flow rate as obtained.

2. The method according to claim 1, wherein the preset values of both the upstream canal flow rate and the surface water infiltration rate are optimized by a genetic algorithm.

3. The method according to claim 1, wherein the preset threshold value is less than or equal to 1.5%.

4. The method according to 1, wherein the measured value of the upstream water depth and the measured value of the downstream water depth of the target canal are obtained by vertically placing a water gauge at the upstream and the downstream of the target canal, respectively.

5. The method according to 1, wherein substituting the measured value of the upstream water depth, the preset value of the upstream canal flow rate and the preset value of the surface water infiltration rate into Saint-Venant equations to solve so as to obtain the simulation value of the downstream water depth of the target canal comprises: re-expressing the Saint-Venant equations to obtain discrete expressions of the Saint-Venant equations; and substituting the measured value of the upstream water depth, the preset values of both the upstream canal flow rate and the surface water infiltration rate into the discrete expressions of the Saint-Venant equations to solve so as to obtain a simulation value of the downstream water depth of the target canal, wherein the Saint-Venant equations are as follows:

$$\frac{\partial A}{\partial t} + \frac{\partial Q}{\partial x} = -I, \text{ and}$$

$$\frac{\partial Q}{\partial t} + \frac{\partial}{\partial x}\left(\frac{Q^2}{A}\right) = -gA\frac{\partial \zeta}{\partial x} - g\frac{n^2 Q|Q|}{R^{4/3}A};$$

and the discrete expressions of the Saint-Venant equations are as follows:

$$\frac{A_i^{n_t+1} - A_i^{n_t}}{\Delta t} + \frac{Q_{i+1/2}^{n_t+1} - Q_{i-1/2}^{n_t+1}}{\Delta x} = -I_i^{n_t}, \text{ and}$$

$$\frac{Q_i^{n_t+1} - Q_i^{n_t}}{\Delta t} + \frac{1}{\Delta x}\left[\frac{(Q_{i+1/2}^{n_t+1})^2}{A_{i+1/2}^{n_t+1}} - \frac{(Q_{i-1/2}^{n_t+1})^2}{A_{i-1/2}^{n_t+1}}\right] =$$

$$-gA_i^{n_t+1}\frac{\zeta_{i+1/2}^{n_t+1} - \zeta_{i-1/2}^{n_t+1}}{\partial x} - g\frac{n^2 Q_i^{n_t+1}|Q_i^{n_t+1}|}{(R_i^{n_t+1})^{4/3}A_i^{n_t+1}},$$

wherein x is the distance between any measurement point of the target canal and the upstream of the target canal in m; t is a time coordinate of the target canal whose observation time is regarded as zero in s; A is an area of the flow cross section at any measurement point of the target canal in m$^2$, and A=tanθ*h$^2$+wh; w is the width of the bottom surface of the target canal in m; h is a water depth at any measurement point of the target canal in m; θ is an included angle between each of two side slopes of the target canal and the vertical direction; Q is the canal flow rate at any measurement point of the target canal in m$^3$/s; g is the gravitational acceleration in m/s$^2$; ζ is the water surface elevation in m, and ζ=$Z_b$+h; $Z_b$ is a relative elevation of the canal bottom at any measurement point of the target canal in m; n is a Manning roughness coefficient in s/m$^{1/3}$, and its empirical value is 0.001-0.1; I is a water surface infiltration rate in m/s; R is a hydraulic radius and R=A/P, wherein P is wetted perimeter in m; $n_t$ is a time discrete node obtained at time t; i is a space discrete node obtained based on x; i+½ is the midpoint between space discrete nodes i and i+1; and i−½ is the midpoint between space discrete nodes i−1 and i.

6. The method according to claim 1, wherein the relative error between the simulation value and the measured value of the downstream water depth is obtained through the following calculation formula:

$$ARE = \frac{|h_c - h_d|}{h_d}100\%$$

wherein ARE is the relative error; $h_c$ is the simulation value of the downstream water depth in m; and $h_d$ is the measured value of the downstream water depth in m.

7. The method according to claim 3, wherein the preset threshold is less than 1%.

8. The method according to 1, wherein the canal flow rate at any measurement point of the target canal is obtained according to the viable upstream canal flow rate and surface water infiltration rate through the following formula:

$$Q_{u0} = I_k \times L + Q_x,$$

wherein $Q_{u0}$ is the viable upstream canal flow rate in m$^3$/s, namely the viable preset value of the upstream canal flow rate; $Q_x$ is the canal flow rate at any measurement point of the target canal in m$^3$/s; $I_k$ is the viable surface water infiltration rate, namely the finalized preset value of the surface water infiltration rate; and L is the distance between any measurement point and the upstream of the target canal in m.

* * * * *